(12) United States Patent
Bolognese et al.

(10) Patent No.: US 6,674,044 B2
(45) Date of Patent: Jan. 6, 2004

(54) SYSTEM FOR THE CONTROL OF THE QUALITY OF A LASER CUT OR PERFORATION, IN PARTICULAR FOR SHEETS OF METAL

(75) Inventors: Luca Bolognese, Genoa (IT); Giuseppe D'Angelo, Grugliasco (IT); Giorgio Pasquettaz, Vercelli (IT)

(73) Assignee: Salvagnini Italia S.p.A. (IT)

( * ) Notice: Subject to any disclaimer, the term of this patent is extended or adjusted under 35 U.S.C. 154(b) by 2 days.

(21) Appl. No.: 10/166,215

(22) Filed: Jun. 10, 2002

(65) Prior Publication Data
US 2003/0010760 A1 Jan. 16, 2003

(30) Foreign Application Priority Data
Jul. 13, 2001 (IT) ...................................... MI2001A1506

(51) Int. Cl.[7] ............................................... B23K 26/14
(52) U.S. Cl. ................................................. 219/121.73
(58) Field of Search ........................ 219/121.63, 121.64, 219/121.65, 121.66, 121.67, 121.68, 121.69, 121.7, 121.71; 700/166; 706/900, 903, 904

(56) References Cited
U.S. PATENT DOCUMENTS 5,517,420 A * 5/1996 Kinsman et al. ............ 700/166
6,210,514 B1 * 4/2001 Cheung et al. .............. 156/241
2002/0144984 A1 * 10/2002 Mori et al. ............. 219/121.64

* cited by examiner

Primary Examiner—Kiley Stoner
Assistant Examiner—Jonathan Johnson
(74) Attorney, Agent, or Firm—Akerman Senterfitt

(57) ABSTRACT

In a system for the control of the quality of a laser cut or perforation, comprising means to focus a laser beam onto a cut or perforation zone, photodiode sensor means to detect the radiation emitted by the cut or perforation zone, and a control and processing electronic unit to process the signals emitted by said sensor means an optical filter is provided that is associated with said photodiode sensor means to select an optical band around 620 nm. The signal coming from said sensor means is acquired with a frequency comprised between 10 and 60 kHz and filtered with a band-pass filter between 7 and 16 kHz. In this way the control of the quality of the cut or perforation can be carried out on the basis of the sole signal thus processed, without the need of a comparison with the predetermined reference signal corresponding to a good quality cut or perforation.

2 Claims, 1 Drawing Sheet

SYSTEM FOR THE CONTROL OF THE QUALITY OF A LASER CUT OR PERFORATION, IN PARTICULAR FOR SHEETS OF METAL

FIELD OF INVENTION

The present invention concerns a system for the control of the quality of a laser cut or perforation, in particular for sheets of metal, by perforation herein essentially meaning the formation of the initial hole in preparation of the sheet metal cutting.

More precisely the present invention refers to systems for the verification of the absence of burr in the case of a laser cut and of the executed perforation or breaking of the sheet metal in the case of a laser perforation, and even more precisely to a system of the type comprising:

means to focus a laser beam onto a cut or perforation zone.

photodiode sensor means to detect the radiation emitted by the cut or perforation zone, and an electronic control and processing unit to process the signals emitted by said sensor means.

BACKGROUND OF INVENTION

Systems of the aforementioned type have already been proposed and used in the past to carry out an on-line monitoring of the laser cutting process of the sheet metal, and this with the aim of estimating the presence or absence of burrs in the cut zone.

The inconvenience with the systems used so far resides in the fact that they base the control of the quality on a comparison between the signals that are detected during the cutting process and one or more predetermined reference signals indicative of a good quality cut, that is in the absence of burr. Such reference signals, usually in a number varying from two to ten, are predisposed starting from several good quality cut specimens. Obviously, this way to proceed implies the presence of an expert operator who is capable to certify the soundness of the cut at the moment of the creation of the reference signals, it involves expenditure of time and sometimes even waste of material (that gets wasted in order to produce the specimens necessary to obtain the reference signals). In some cases reference signals indicative of a cut with defects, that is with presence of burr, are also provided which involves additional problems and difficulty.

SUMMARY OF THE INVENTION

The main scope of the present invention is to provide a system for the control of the quality of a laser cut, that allows to overcome all the aforesaid disadvantages.

Another scope is to provide a system for the control of the quality that is usable also to verify the executed perforation or breaking in a process of perforation of the sheet metal.

In order to attain such scopes, the invention has as an object a system for the control of the quality of a laser cut or perforation having the characteristics indicated at the beginning and characterised also in that an optical filter is associated with the aforesaid photodiode sensor means that is suitable to select an optical band around 620 nm, in that said control and processing means are suitable to acquire the signal coming from said sensor means with a frequency comprised between 10 and 60 kHz and in that said control and acquisition means are suitable to filter the acquired signal with the aid of a band-pass filter between 7 and 16 kHz, in such way so that the control of the quality of the cut or the perforation can be carried out on a basis of the sole signals thus processed, without the need of a comparison with predetermined reference signals corresponding to a good quality cut or perforation.

In the preferred embodiment, the aforesaid control and processing means are suitable to divide the acquired and filtered signal into blocks, to make an average of the signal for each block being sampled and to identify the presence of a defect in the cut or perforation in the case in which such blocks shows a value higher than the offset of the sensor means.

Past experiences by the applicant have shown that, owing to the aforesaid characteristics, the simple analysis of the signals detected during the cut or perforation process is therefore sufficient to allow the identification of possible defects, without any need to predispose reference signals indicative of a good quality cut or perforation and therefore with the advantage to eliminate the relatively laborious operations for the predisposition of reference signals.

Naturally, the invention has also for an object the procedure for the control of the quality of a laser cut or perforation that utilises the above described system.

Additional characteristics and advantages of the invention will become evident from the following description with reference to the enclosed drawings, that are provided as a purely non-limiting example, in which:

DETAILED DESCRIPTION

Figure 1:
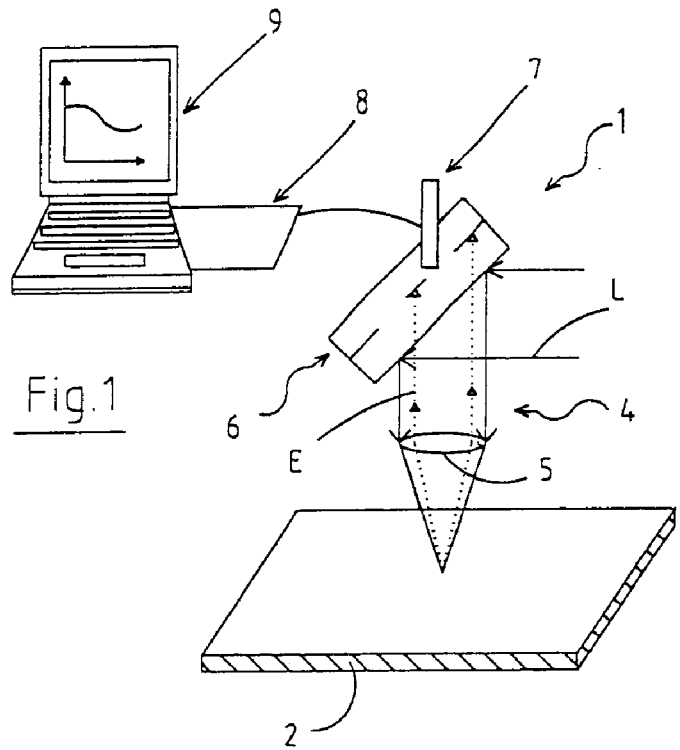
FIG. 1 is a schematic view of system according to the invention.

With reference to FIG. 1, number 1 indicates as a whole a system for the control of the quality of a laser cut or perforation process, more precisely for the control of the absence of burr in a cutting process or of the executed perforation or breaking in a perforation process.

The example refers to the case of a sheet metal 2 that is cut or perforated by means of a laser beam. Number 4 indicates as a whole the focusing head, including a lens 5 to which the laser beam originated by a laser generator (not illustrated) gets and reflected by a semi-reflecting mirror 6. The radiation E emitted by the cut or perforation zone passes through the reflecting mirror 6 and is detected by a sensor 7 made up of a photodiode capable to send its output signal to an electronic control and processing unit 8 associated with a personal computer 9.

In an embodiment, the semi-reflecting mirror 6 used is a ZnSe mirror, with a 5 cm diameter, 5 millimeter thickness. The sensor 7 was a photodiode with spectral response between 190 and 1100 nm, a 1.1×1.1 millimeters active area and a quartz window.

Figure 3:
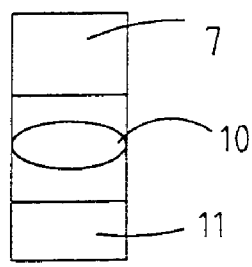
FIG. 3 is schematic view of the sensor means that are part of the system in FIG. 1.

With reference to FIG. 3, a focusing lens 10 is associated with the photodiode 7 that is capable to concentrate the incoming beam onto the sensor after it has been filtered by an optical filter 11.

According to the invention, the optical filter 11 associated with the sensor has an optical band around 620 nm, for the selection of the radiation coming from the cut or perforation zone.

Always in the case of an embodiment, the electronic unit 8 comprises a data acquisition card of the NI 6110E type PC card, with the maximum acquisition frequency of 5 Mb/sec.

Figure 2:
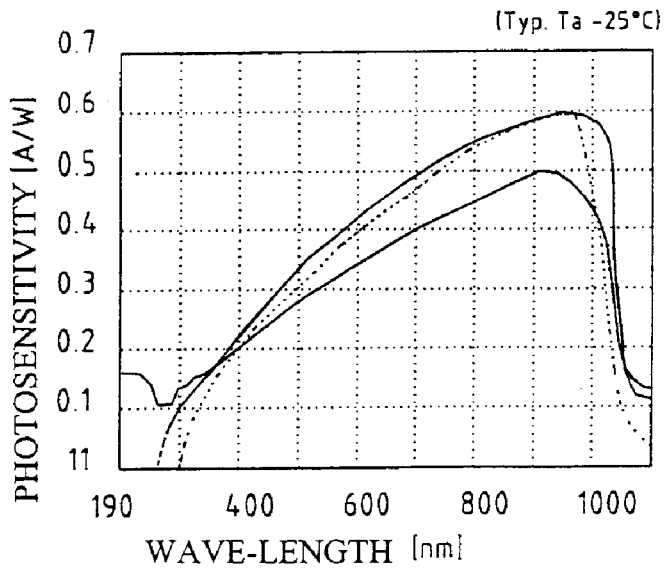
FIG. 2 is a diagram that shows the spectral response of the photodiode used in the system according to the invention.

FIG. 2 shows a diagram of the spectral response of the photodiode 7.

According to an additional important characteristic of the invention, the electronic unit 8 acquires the signals emitted by the sensor 7 with a frequency in the range from 10 kHz to 60 kHz. In addition a filtering of the signal is carried out by means of a band-pass filter between 7 kHz and 16 kHz, that is inserted in the electronic unit 8 but not shown in the figures.

Studies and experiences led by the applicant have shown that by dividing the signal thus acquired and filtered into blocks, by calculating the average of the signal in each sample block, the blocks having a value higher than the offset of the photodiode are indicative of the presence of a defect.

In other words, owing to the characteristics that have been indicated above, the system according to the invention is capable to verify the absence of defects of the cut or perforation, in particular the absence of burr in a cutting process and the executed perforation or breaking in a perforation process, without having to resort to a comparison with reference signals indicative of a good quality cutting or executed perforation, but simply on the basis of an analysis of the frequency of the signals obtained during the real process. In practice, when there is a cut or perforation defect, in one or more sample blocks of the signal emitted by the sensor a value higher than the average offset of the sensor is detected.

The laborious operations that are instead necessary with the known systems in order to predispose the reference signal are thus prevented.

Naturally, holding good the principle that is at the basis of the invention, the construction details and embodiments can largely vary as regards to what described and illustrated purely as an example, without for this going beyond the limits of the present invention.

What is claimed is:

1. Procedure for the control of the quality of a laser cut or perforation, comprising the stages:

to focus a laser beam on a cut or perforation zone, to detect the radiation emitted by the cut or perforation zone with the aid of photodiode sensor means, and to process the signal emitted by said sensor means, characterised in that an optical filter is associated with said photodiode sensor means that is suitable to select an optical band around 620 nm, in that the signal coming from the sensor means is acquired with a frequency comprised between 10 and 60 kHz and in that the acquired signal is filtered with the aid of a band-pass filter between 7 and 16 kHz, in such way that the control of the quality of the cut or perforation can be carried out on a basis of the sole signal thus processed, without the need of a comparison with the predetermined reference signal corresponding to a good quality cut or perforation.

2. Procedure according to claim 1, characterised in that the signal thus acquired and filtered is divided into blocks and that the average of the signal for each sample block is made, the blocks having a value lower or equal to the offset of the sensor means being indicative of the presence of a defect.

* * * * *